(12) United States Patent
Lee

(10) Patent No.: US 12,744,957 B2
(45) Date of Patent: Sep. 22, 2026

(54) GLOBAL INTERGRADED TUNER APPARATUS AND METHOD FOR CONTROLLING THE SAME

(71) Applicant: LG ELECTRONICS INC., Seoul (KR)

(72) Inventor: Kwang Ryul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/960,369

(22) Filed: Nov. 26, 2024

(65) Prior Publication Data

US 2025/0211812 A1 Jun. 26, 2025

(30) Foreign Application Priority Data

Dec. 26, 2023 (KR) ........................ 10-2023-0190933

(51) Int. Cl.
*H04N 21/426* (2011.01)

(52) U.S. Cl.
CPC ............................... *H04N 21/4263* (2013.01)

(58) Field of Classification Search
CPC ............. H04N 21/4263; H04N 21/426; H04N 21/4383
See application file for complete search history.

(56) References Cited

U.S. PATENT DOCUMENTS 7,990,480 B2 * 8/2011 Naito .................... H03J 1/0083 348/731
9,686,579 B2 * 6/2017 Majid ................ H04N 21/4183
11,395,418 B2 * 7/2022 Fujino .................. H04N 21/426
11,515,615 B2 * 11/2022 Oh ....................... H01Q 1/2258
2006/0090191 A1 * 4/2006 Takagi ................ H04N 21/426 386/E5.07

(Continued)

FOREIGN PATENT DOCUMENTS

KR 1020120070347 6/2012
KR 1020210131743 11/2021

OTHER PUBLICATIONS

Korean Intellectual Property Office Application No. 10-2023-0190933, Office Action dated Feb. 3, 2025, 5 pages.

*Primary Examiner* — Michael B. Pierorazio
(74) *Attorney, Agent, or Firm* — LEE, HONG, DEGERMAN, KANG & WAIMEY

(57) ABSTRACT

A global integrated tuner apparatus includes a switch device configured to selectively connect one of the plurality of connectors, a tuner device configured to tune a broadcast signal received through the connector selectively connected by controlling the switch device, and a controller configured to control the tuner device, wherein the controller may identify a set area when an external cable is connected to one of the plurality of connectors, control the tuner device such that the switch device is connected to a first connector of a type corresponding to a digital broadcast transmission standard of the set area, determine whether the first connector is normally connected by determining whether the tuner device has tuned the broadcast signal, and control the tuner device such that switch device is connected to a second connector of a different type from the first connector when the first connector is not normally connected.

13 Claims, 9 Drawing Sheets

(56) References Cited

U.S. PATENT DOCUMENTS

2007/0242165 A1* 10/2007 Naito ...................... H04N 5/46
348/731
2016/0353152 A1* 12/2016 Majid .................. H04N 21/422
2020/0352040 A1* 11/2020 Fujino .................. H05K 5/0069

* cited by examiner

GLOBAL INTERGRADED TUNER APPARATUS AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2023-0190933, filed on Dec. 26, 2023, the contents of which are all incorporated by reference herein in its entirety.

BACKGROUND OF THE INVENTION

1. Field of the Invention

The present disclosure relates to a global integrated tuner apparatus capable of receiving digital broadcasting in the same manner even in areas with different digital broadcast transmission standards and a method for controlling the same.

2. Discussion of the Related Art

Generally, a tuner apparatus is an apparatus capable of selecting and receiving a desired channel frequency from a plurality of broadcast signals, including terrestrial broadcast signals, cable broadcast signals, and satellite broadcast signals, and processing the received channel frequency into an intermediate frequency that may be processed by a demodulator.

However, the tuner apparatus has been developed to use a unique type of jack physically suitable for a specific digital broadcast transmission standard, causing a problem in that the tuner apparatus could not be used in areas where the digital broadcast transmission standard is different.

For example, in areas that use the ATSC (Advanced Television System Committee) standard among digital broadcast transmission standards, a tuner apparatus including a first type jack is used, and in areas that use the DVB (Digital Video Broadcasting) standard, a tuner apparatus including a second type jack is used.

Therefore, a display device using a tuner device including a first type jack may receive broadcasts in an area using the ATSC standard, but cannot receive broadcasts in an area using the DVB standard. A display device using a tuner device including a second type jack may receive broadcasts in areas that use the DVB standard, but cannot receive broadcasts in areas that use the ATSC standard.

Therefore, in the future, there is a need to develop a global integrated tuner apparatus capable of equally receiving digital broadcasting in areas with different digital broadcast transmission standards.

SUMMARY OF THE INVENTION

The present disclosure aims to solve the above-described problems and other problems.

The present disclosure provides a global integrated tuner apparatus and a method of controlling the same which enable the same reception of digital broadcasting in areas with different digital broadcast transmission standards by integrating a plurality of connectors having different types for digital broadcast transmission standards, and a switch device for selectively connecting one of the plurality of connectors into a main board.

Further, the present disclosure provides a global integrated tuner apparatus and a method of controlling the same, which reduce the number of development models and samples, and reduce the cost of tuner development by providing flexibility and freedom in material supply by integrating different tuners for different digital broadcast transmission standards into a single main board.

Further, the present disclosure provides a global integrated tuner apparatus and a method of controlling the same, which enable the same reception of digital broadcasting without malfunctioning even when a cable with a different digital broadcast transmission standard is incorrectly inserted into a specific connector or when there is a movement to an area with a different digital broadcast transmission standard.

According to an aspect of the present disclosure, a global integrated tuner apparatus includes a plurality of connectors of different types for digital broadcast transmission standards, a switch device configured to selectively connect one of the plurality of connectors, a tuner device configured to tune a broadcast signal received through the connector selectively connected by controlling the switch device, and a controller configured to control the tuner device, wherein the controller may identify a set area when an external cable is connected to one of the plurality of connectors, control the tuner device such that the switch device is connected to a first connector of a type corresponding to a digital broadcast transmission standard of the set area, determine whether the first connector is normally connected by determining whether the tuner device has tuned the broadcast signal, and control the tuner device such that switch device is connected to a second connector of a different type from the first connector when the first connector is not normally connected.

According to an aspect of the present disclosure, a method of controlling a global integrated tuner apparatus including a switch device that selectively connects one of a plurality of connectors of different types for digital broadcast transmission standards, the control method includes identifying a set area when an external cable is connected to one of the plurality of connectors, controlling the tuner device such that the switch device is connected to a first connector of a type corresponding to a digital broadcast transmission standard of the set area, determining whether the first connector is normally connected by determining whether the tuner device has tuned the broadcast signal, and controlling the tuner device such that switch device is connected to a second connector of a different type from the first connector when the first connector is not normally connected.

According to an embodiment of the present disclosure, the global integrated tuner apparatus may enable the same reception of digital broadcasting in areas with different digital broadcast transmission standards by integrating a plurality of connectors having different types for digital broadcast transmission standards, and a switch device for selectively connecting one of the plurality of connectors into a main board.

Further, the present disclosure may reduce the number of development models and samples, and reduce the cost of tuner development by providing flexibility and freedom in material supply by integrating different tuners for different digital broadcast transmission standards into a single main board.

Further, the present disclosure may enable the same reception of digital broadcasting without malfunctioning even when a cable with a different digital broadcast transmission standard is incorrectly inserted into a specific connector or when there is a movement to an area with a different digital broadcast transmission standard.

DETAILED DESCRIPTION OF THE PREFERRED EMBODIMENTS

Figure 1:
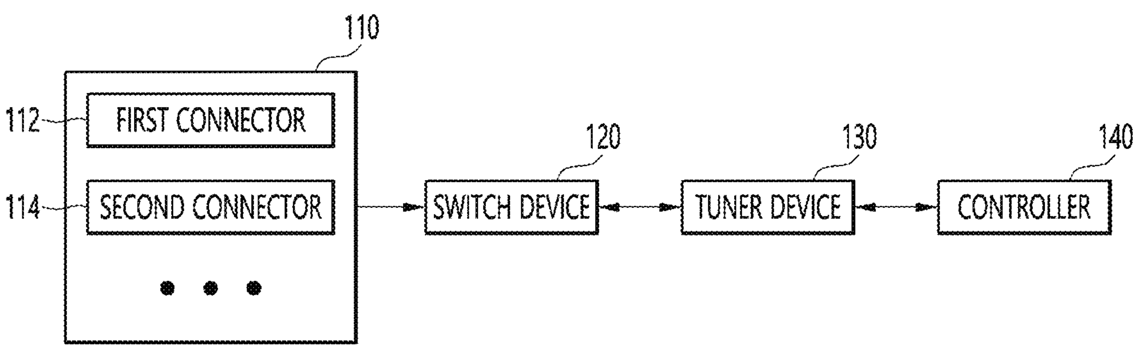
FIG. 1 is a block diagram showing the configuration of a global integrated tuner apparatus according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. The suffixes "module" and "unit or portion" for components used in the following description are merely provided only for facilitation of preparing this specification, and thus they are not granted a specific meaning or function. In addition, when it is determined that the detailed description of the related known technology may obscure the gist of embodiments disclosed herein in describing the embodiments, a detailed description thereof will be omitted. Further, the accompanying drawings are intended to facilitate understanding of the embodiments disclosed herein, and the technical spirit disclosed herein are not limited by the accompanying drawings. Therefore, the present disclosure should be construed as including all the changes, equivalents, and substitutions included in the spirit and scope of the present disclosure.

The terms coming with ordinal numbers such as 'first', 'second', or the like may be used to denote various components, but the components are not limited by the terms. The terms are used merely for the purpose to distinguish a component from the other component.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 2:
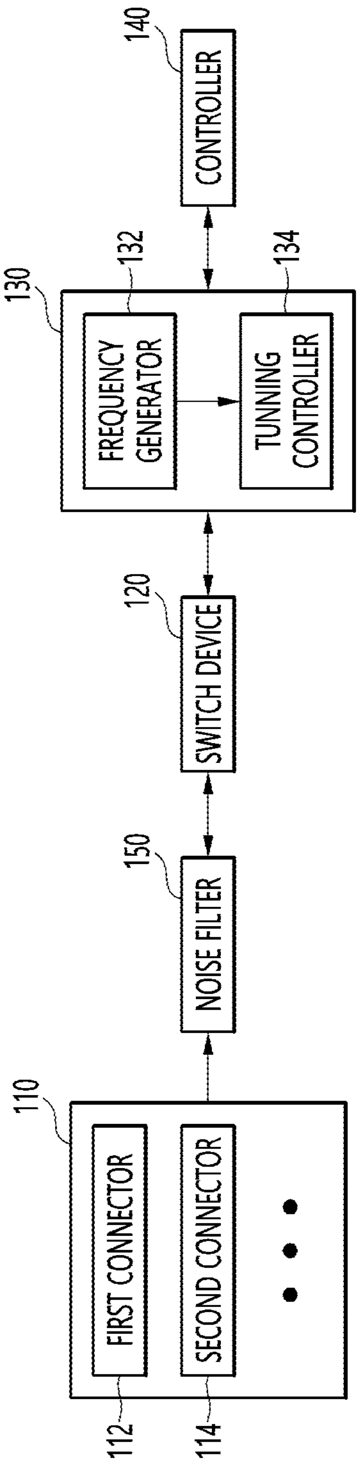
FIG. 2 is a block diagram showing the configuration of a global integrated tuner apparatus according to another embodiment of the present disclosure.

FIG. 1 is a block diagram showing the configuration of a global integrated tuner apparatus according to an embodiment of the present disclosure, and FIG. 2 is a block diagram showing the configuration of a global integrated tuner apparatus according to another embodiment of the present disclosure.

Referring to FIGS. 1 and 2, a global integrated tuner apparatus of the present disclosure may include a plurality of connectors 110 of different types for digital broadcast transmission standards, a switch device 120 that selectively connects any one of the plurality of connectors 110, a tuner device 130 that tunes a broadcast signal received through the connector 110 selectively connected by controlling the switch device 120, and a controller 140 that controls the tuner device 130.

Here, the plurality of connectors 110 may include a plurality of reception jacks of different types.

As an example, the plurality of reception jacks may include a first type jack for receiving broadcast signals of ATSC (Advanced Television System Committee) standard, as a first connector 112, and a second type jack for receiving broadcast signals of DVB (Digital Video Broadcasting) standard as a second connector 114.

In addition, the switch device 120 may be electrically connected to one of the plurality of connectors 110 and the tuner device 130, and may perform switching to selectively connect one of the plurality of connectors 110 in response to a control signal from the tuner device 130.

As an example, the switch device 120 may include a radio frequency (RF) switch, or the like.

According to the present disclosure, as shown in FIG. 2, a noise filter 150 capable of removing noise occurring from wiring connecting the connector 110 and the switch device 120 may be further disposed between the switch device 120 and the connector 110.

As an example, the noise filter 150 may include one filter commonly connected to a plurality of wiring lines connecting the plurality of connectors 110.

In some cases, as another example, the noise filter 150 may include a plurality of filters respectively connected to wiring lines respectively connected to the connectors 110.

One noise filter 150 or a plurality of noise filters 150 may be disposed according to the size of a main board, and a filter type may be selected according to the length and noise frequency of the wiring connecting the connector 110 and the switch device 120.

Next, the tuner device 130 may include a frequency generator 132 that generates and outputs a reference frequency, and a tuning controller 134 that tunes the frequency of a broadcast signal based on the reference frequency output from the frequency generator 132.

Here, the tuning controller 134 may control the switching of the switch device 120 to be connected to one of the plurality of connectors 110 in response to a control signal from the controller 140, and tune the frequency of a broadcast signal based on the reference frequency output from the frequency generator 132 when the broadcast signal is input through the connector 110 selectively connected by the switch device 120.

As an example, the frequency generator 132 may include a crystal oscillator, or the like.

In addition, the tuning controller 134 may include a Radio Frequency Integrated Circuit (RF Ic), or the like.

Next, the controller 140 may identify a set area when an external cable is connected to one of the plurality of connectors 110, control the tuner device 130 such that the switch device 120 is connected to the first connector 112 of a type corresponding to the digital broadcast transmission standard of the set area, determine whether the first connector 112 is normally connected by determining whether the tuner device 130 has tuned a broadcast signal, and control the tuner device 130 such that the switch device 120 is connected to the second connector 114 of a different type from the first connector 112 when the first connector 112 is not normally connected.

In this case, the controller 140 may identify pre-stored tuner setting information when an external cable for receiving a broadcast signal is connected to one of the plurality of connectors 110 having different types in identifying the set area, and identify the set area included in the tuner setting information.

As an example, the tuner setting information may include set area information, digital broadcast transmission standard information corresponding to the set area, and connector type information corresponding to the digital broadcast transmission standard of the set area.

Further, the controller 140 may identify pre-stored tuner setting information when the set area is identified in controlling the tuner device 130 to be connected to the first connector 112, identify connector type information corresponding to the digital broadcast transmission standard of the set area included in the tuner setting information, and control the tuner device 130 to be connected to the first connector 112 having a connector type corresponding to the set area based on the connector type information.

In this case, the tuner setting information may include set area information, digital broadcast transmission standard information corresponding to a set area, and connector type information corresponding to the digital broadcast transmission standard of the set area.

As an example, the controller 140 may control the tuner device 130 such that the switch device 120 is connected to the connector 110 of the ATSC standard when the digital broadcast transmission standard of the set area is the ATSC (Advanced Television System Committee) standard and control the tuner device 130 such that the switch device 120 is connected to the connector 110 of the DVB standard when the digital broadcast transmission standard of the set area is the DVB (Digital Video Broadcasting) standard.

Subsequently, the controller 140 may determine whether the tuner 130 has tuned a broadcast signal when the switch device 120 is connected to the first connector 112 having a connector type corresponding to the digital broadcast transmission standard of the set area in determining whether the first connector 112 is normally connected, determine that an external cable is normally connected to the first connector 112 having a connector type corresponding to the digital broadcast transmission standard of the set area when the tuner device 130 has tuned the broadcast signal normally, and determine that the external cable is not connected to the first connector 112.

When it is determined that the external cable is not connected to the first connector 112, the controller 140 may determine that the external cable is connected to the second connector 114 of a different type from the first connector 112, and generate and provide a user notification for guiding a user to disconnect the external cable from the second connector 114 and connect the external cable to the first connector 112.

As an example, when generating and providing the user notification, the controller 140 may generate and provide the user notification according to one of a first output method for controlling a display device to generate a user notification in the form of a message and output the user notification on a display screen, a second output method for controlling a sound output device to generate a user notification in the form of a voice and output the user notification through a speaker, a third output method for controlling a light emitting device to generate a user notification in the form of light and output the user notification through a light emitter, and a fourth output method for controlling a vibrator to generate a user notification in the form of vibration and output the user notification through a vibrating body.

Next, the controller 140 may determine whether the second connector 114 is normally connected by identifying whether the tuner device 130 has tuned a broadcast signal when the switch device 120 is connected to the second connector 114 of a different type from the first connector 112 in controlling the tuner device 130 to be connected to the second connector 114 of the different type from the first connector 112, determine that an external cable is normally connected to the second connector 114 having a connector type corresponding to the digital broadcast transmission standard of a set area when the second connector 114 is normally connected, and terminate the control of the tuner device 130.

In this case, the controller 140 may determine that the first digital broadcast transmission standard of a set area is different from the second digital broadcast transmission standard of a currently located area when the second connector 114 is not normally connected in determining whether the second connector 114 is normally connected, reset the set area to an area that provides the second digital broadcast transmission standard, control the tuner device 130 such that the switch device 120 is connected to the first connector 112 of a type corresponding to the reset area, determine whether the first connector 112 is normally connected by identifying whether the tuner device 130 has tuned a broadcast signal and control the tuner device 130 such that the switch device 120 is connected to the second connector 114 of a different type from the first connector when the first connector 112 is not normally connected.

For example, the controller 140 may perform resetting to switch the set area from an area that provides broadcast in ATSC (Advanced Television System Committee) standard to an area that provides broadcasts in DVB (Digital Video Broadcasting) standard when the first digital broadcast transmission standard of the set area is the ATSC standard and the second digital broadcast transmission standard of the currently located area is the DVB standard in resetting the set area or perform resetting to switch the set area from the area that provides broadcast of the DVB standard to the area that provides broadcasts in the ATSC standard when the first digital broadcast transmission standard of the set area is the DVB standard and the second digital broadcast transmission standard of the currently located area is the ATSC standard.

In some cases, the controller 140 may generate and provide a user notification for guiding a user to manually reset a set area from an area that provides broadcasts in the first digital broadcast transmission standard to an area that provides broadcast in the second digital broadcast transmission standard when resetting the set area, or generate and provide a user notification for informing that automatic resetting from an area that provides broadcast in the first digital broadcast transmission standard to an area that provides broadcast in the second digital broadcast transmission standard has been completed.

In this case, when generating and providing the user notification, the controller 140 may generate and provide the user notification according to one of a first output method for controlling a display device to generate a user notification in the form of a message and output the user notification on a display screen, a second output method for controlling a sound output device to generate a user notification in the form of a voice and output the user notification through a speaker, a third output method for controlling a light emitting device to generate a user notification in the form of light and output the user notification through a light emitter, and a fourth output method for controlling a vibrator to generate a user notification in the form of vibration and output the user notification through a vibrating body.

In addition, the controller 140 may determine whether the tuner 130 has tuned a broadcast signal when the switch device 120 is connected to the first connector 112 having a connector type corresponding to the reset area in determining whether the first connector 112 is normally connected, determine that an external cable is normally connected to the first connector 112 having a connector type corresponding to the digital broadcast transmission standard of the reset area when the tuner device 130 has tuned the broadcast signal normally, and determine that the external cable is not connected to the first connector 112.

When it is determined that the external cable is not connected to the first connector, the controller 140 may determine that the external cable is connected to the second connector 114 of a different type from the first connector 112, and generate and provide a user notification for guiding a user to disconnect the external cable from the second connector 114 and connect the external cable to the first connector 112.

As an example, when generating and providing the user notification, the controller 140 may generate and provide the user notification according to one of a first output method for controlling a display device to generate a user notification in the form of a message and output the user notification on a display screen, a second output method for controlling a sound output device to generate a user notification in the form of a voice and output the user notification through a speaker, a third output method for controlling a light emitting device to generate a user notification in the form of light and output the user notification through a light emitter, and a fourth output method for controlling a vibrator to generate a user notification in the form of vibration and output the user notification through a vibrating body.

Subsequently, the controller 140 may determine whether the second connector 114 is normally connected by identifying whether the tuner device 130 has tuned a broadcast signal when the switch device 120 is connected to the second connector 114 of a different type from the first connector 112 in controlling the tuner device 130 to be connected to the second connector 114 of the different type from the first connector 112, determine that an external cable is normally connected to the second connector 114 having a connector type corresponding to the digital broadcast transmission standard of a reset area when the second connector 114 is normally connected, and terminate the control of the tuner device 130.

As described above, the present disclosure may enables the same reception of digital broadcasting in areas with different digital broadcast transmission standards by integrating a plurality of connectors having different types for digital broadcast transmission standards, and a switch device for selectively connecting one of the plurality of connectors into a main board.

Further, the present disclosure may reduce the number of development models and samples, and reduce the cost of tuner development by providing flexibility and freedom in material supply by integrating different tuners for different digital broadcast transmission standards into a single main board.

Further, the present disclosure may enable the same reception of digital broadcasting without malfunctioning even when a cable with a different digital broadcast transmission standard is incorrectly inserted into a specific connector or when there is a movement to an area with a different digital broadcast transmission standard.

Figure 3:
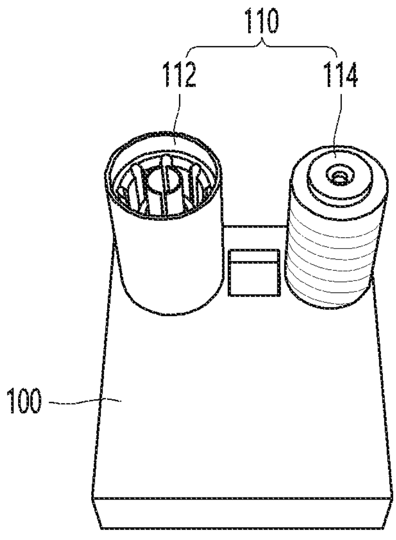
FIG. 3 is a diagram for describing a plurality of connectors of a global integrated tuner apparatus according to an embodiment of the present disclosure.

FIG. 3 is a diagram for describing a plurality of connectors of a global integrated tuner apparatus according to an embodiment of the present disclosure.

Referring to FIG. 3, the global integrated tuner apparatus 100 of the present disclosure may include a plurality of connectors 110 of different types for digital broadcast transmission standards.

The plurality of connectors 110 may include a plurality of reception jacks of different types.

As one example, the first connector 112 of the plurality of connectors 110 may be an ATSC-type jack for receiving broadcast signals in the Advanced Television System Committee (ATSC) standard among digital broadcast transmission standards.

Further, the second connector 114 of the plurality of connectors 110 may be a DVB-type jack for receiving broadcast signals in the Digital Video Broadcasting (DVB) standard among other digital broadcast transmission standards.

In some cases, the present disclosure may further include other types of jacks for receiving broadcast signals of other digital broadcast transmission standards in addition to the ATSC-type jack and the DVB-type jack.

Figure 4:
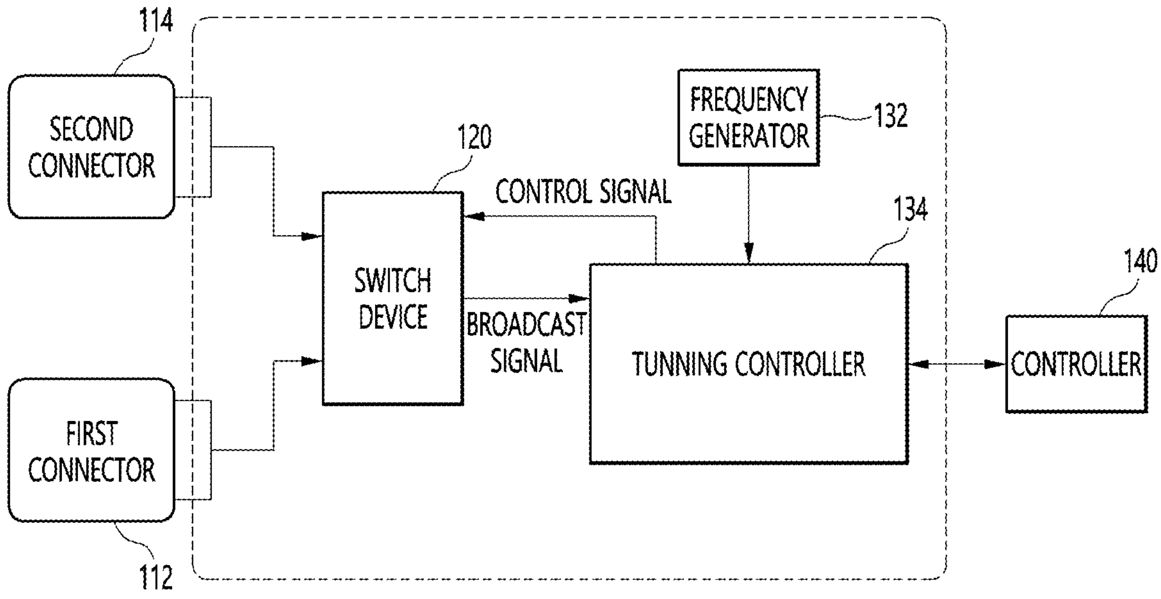
FIG. 4 is a block diagram for describing the configuration of a global integrated tuner apparatus in detail according to an embodiment of the present disclosure.

FIG. 4 is a block diagram for describing the configuration of a global integrated tuner apparatus in detail according to an embodiment of the present disclosure.

Referring to FIG. 4, the present disclosure may include a first connector 112 having an ATSC type jack and a second connector 114 having a DVB type jack.

In this case, the first connector 112 may be an ATSC type jack that receives broadcast signals in the ATSC (Advanced Television System Committee) standard among digital broadcast transmission standards, and the second connector 114 may be a DVB type jack that receives broadcast signals in the DVB (Digital Video Broadcasting) standard among digital broadcast transmission standards.

In addition, the switch device 120 may selectively switch either the first connector 112 or the second connector 114 in response to a control signal from the tuner device 130.

As an example, the switch device 120 may include a radio frequency (RF) switch, or the like.

Subsequently, the tuning controller 134 may control the switch device 120 to selectively switch either the first connector 112 or the second connector 114 in response to a control signal from the controller 140.

In addition, when the switch device 120 is connected to the first connector 112 and broadcast signals of the ATSC standard is input through the first connector 112, the tuning controller 134 may tune the frequency of the broadcast signals of the ATSC standard based on a reference frequency output from the frequency generator 132.

In addition, when the switch device 120 is connected to the second connector 114 and broadcast signals of the DVB standard is input through the second connector 114, the tuning controller 134 may tune the frequency of the broadcast signals of the DVB standard based on a reference frequency output from the frequency generator 132.

For example, the frequency generator 132 may include a crystal oscillator or the like, and the tuning controller 134 may include a radio frequency integrated circuit (RF IC) or the like.

Next, the controller 140 may identify a set area stored in a memory in advance when an external cable is connected to one of the first connector 112 or the second connector 114, and control the tunning controller 134 such that the switch device 120 is connected to the first connector 112 when the digital broadcast transmission standard of the set area is the ATSC standard.

In this case, the controller 140 may determine that the external cable is normally connected when the tuning controller 134 has tuned broadcast signals in the ATSC standard received through the first connector 112, determine that the external cable is abnormally connected when the tuning controller 134 has not tuned broadcast signals in the ATSC standard received through the first connector 112, control the tunning controller 134 such that the switch device 120 is connected to the second connector 114, and determine that the external cable is normally connected when the tuning controller 134 has tuned broadcast signals in the DVB standard received through the second connector 114.

Also, the controller 140 may identify a set area stored in a memory in advance when an external cable is connected to one of the first connector 112 or the second connector 114, and control the tunning controller 134 such that the switch device 120 is connected to the second connector 114 when the digital broadcast transmission standard of the set area is the DVB standard.

In this case, the controller 140 may determine that the external cable is normally connected when the tuning controller 134 has tuned broadcast signals in the DVB standard received through the second connector 114, determine that the external cable is abnormally connected when the tuning controller 134 has not tuned broadcast signals in the DVB standard received through the second connector 114, control the tunning controller 134 such that the switch device 120 is connected to the first connector 112, and determine that the external cable is normally connected when the tuning controller 134 has tuned broadcast signals in the DVB standard received through the second connector 114.

In addition, the controller 140 may determine that the broadcasting system in a currently located area is different from the broadcasting system in the set area when the switch device 120 is connected to the first connector 112 and when the switch device 120 is connected to the second connector 114, reset the digital broadcast transmission standard of the set area to the DVB standard when the digital broadcast transmission standard of the set area is the ATSC standard or reset the digital broadcast transmission standard of the set area to the ATSC standard when the digital broadcast transmission standard of the set area is the DVB standard, and determine whether an external cable is normally connected by identifying whether the tunning controller 134 has tuned broadcast signals when the switch device 120 is connected to the first connector 112 and when the switch device 120 is connected to the second connector 114.

Figure 5:
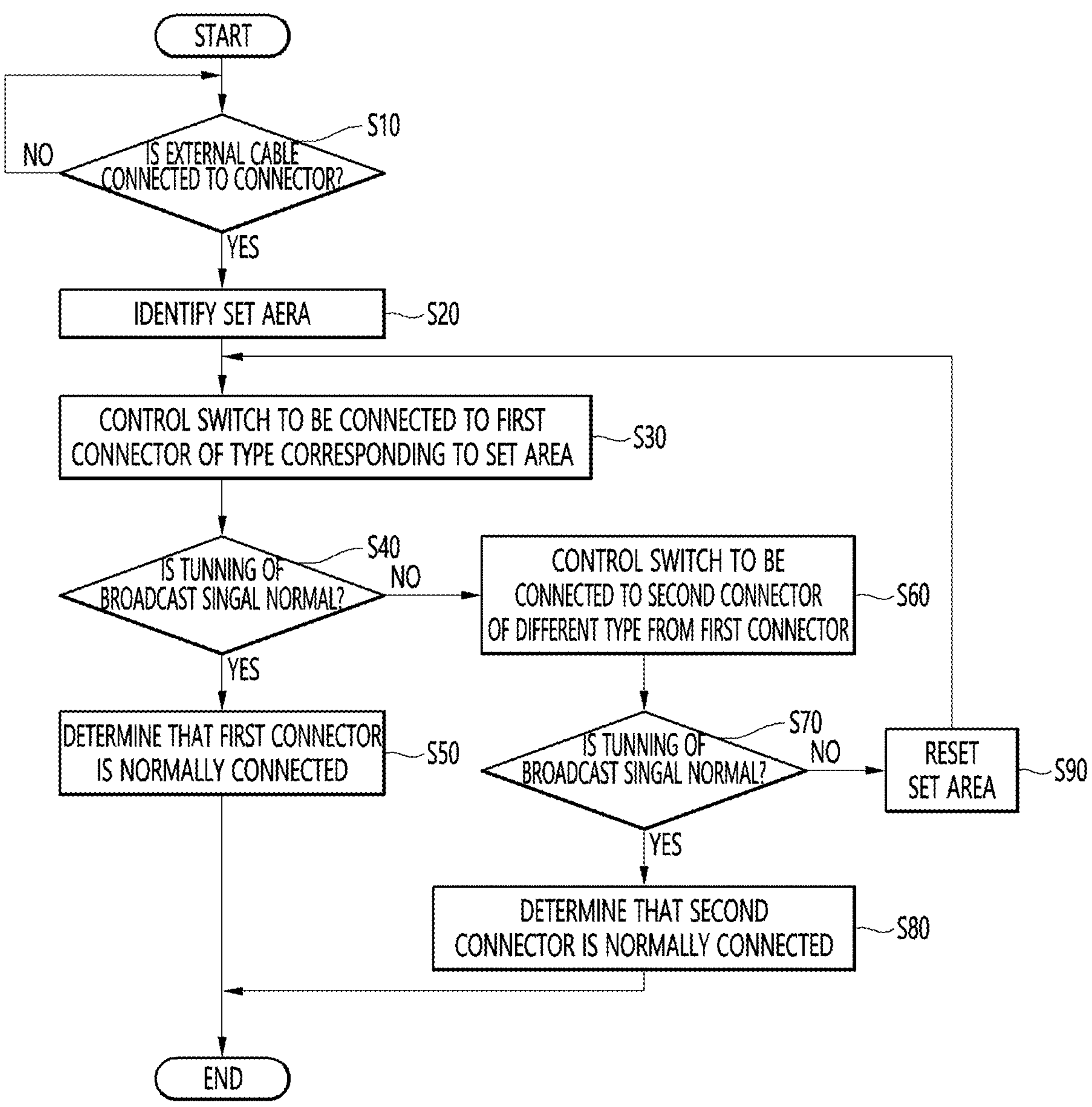
FIG. 5 is a flowchart for describing control operation of a global integrated tuner apparatus according to an embodiment of the present disclosure.

FIG. 5 is a flowchart for describing control operation of a global integrated tuner apparatus according to an embodiment of the present disclosure.

Referring to FIG. 5, the present disclosure may identify whether an external cable is connected to one of a plurality of connectors of different types for digital broadcast transmission standards (S10).

Further, the present disclosure may identify a set area when an external cable is connected to one of the plurality of connectors (S20).

In this case, the present disclosure may identify pre-stored tuner setting information when an external cable for receiving a broadcast signal is connected to one of the plurality of connectors having different types, and identify the set area included in the tuner setting information.

As an example, the tuner setting information may include set area information, digital broadcast transmission standard information corresponding to a set area, and connector type information corresponding to the digital broadcast transmission standard of the set area.

Subsequently, the present disclosure may control a switch device such that the switch device is connected to a first connector of a type corresponding to the digital broadcast transmission standard of the set area (S30).

In this case, the present disclosure may identify pre-stored tuner setting information when the set area is identified, identify connector type information corresponding to the digital broadcast transmission standard of the set area included in the tuner setting information, and perform control to be connected to the first connector 112 having a connector type corresponding to the set area based on the connector type information.

The present disclosure may determine whether the tuning of broadcast signals is normal by identifying whether the tuner device has tuned the broadcast signals (S40).

In this case, the present disclosure may determine whether the broadcast signals have been tuned when the switch device is connected to the first connector having a connector type corresponding to the digital broadcast transmission standard of the set area, determine that an external cable is normally connected to the first connector having the connector type corresponding to the digital broadcast transmission standard of the set area when the broadcast signal have been normally tuned, and determine that the external cable is not connected to the first connector when the broadcast signals have not been tuned.

In addition, the present disclosure may determine that the external cable is normally connected to the first connector when it is determined that the tuning of broadcast signals by the tuner device is normal (S50).

The present disclosure may determine that the first connector is not normally connected when it is determined that the tuning of broadcast signals by the tuner device is abnormal.

Then, the present disclosure may control the switch device such that the switch device is connected to a second connector of a different type from the first connector when the first connector is not normally connected (S60).

The present disclosure may determine whether the tuning of broadcast signals is normal by determining whether the tuner device has tuned the broadcast signals (S70).

In addition, the present disclosure may determine that the external cable is normally connected to the second connector when it is determined that the tuning of broadcast signals by the tuner device is normal (S80).

That is, when the second connector is normally connected, the present disclosure may determine that the external cable is normally connected to the second connector having a connector type corresponding to the digital broadcast transmission standard of the set area, and terminate control of the switch device.

However, when it is determined that the tuning of broadcasting signals by the tuner device is abnormal, the present disclosure may determine that the digital broadcast transmission standard of the set area is different from the digital broadcast transmission standard of a currently located area, and reset the set area to an area that provides the digital broadcast transmission standard of the currently located area (S90).

That is, the present disclosure may determine that the first digital broadcast transmission standard of the set area is different from a second digital broadcast transmission standard of a currently located area when the second connector is not normally connected, reset the set area to an area that provides the second digital broadcast transmission standard, perform control such that the switch device is connected to a first connector of a type corresponding to the reset area, determine whether the first connector is normally connected by determining whether a broadcast signal has been tuned, and perform control such that the switch device is connected to a second connector of a different type from the first connector when the first connector is not normally connected.

In this case, the present disclosure may generate and provide a user notification for guiding a user to manually reset a set area from an area that provides broadcasts in the first digital broadcast transmission standard to an area that provides broadcast in the second digital broadcast transmission standard when resetting the set area, or generate and provide a user notification for informing that automatic resetting from an area that provides broadcast in the first digital broadcast transmission standard to an area that provides broadcast in the second digital broadcast transmission standard has been completed.

The present disclosure may repeatedly perform a first process (S30, S40, S50) of controlling the switch device such that the switch device is connected to the first connector of a type corresponding to the digital broadcast transmission standard of the set area, and determining whether the tuning of broadcast signals is normal by identifying whether the tuner device has tuned the broadcast signals to determine that an external cable is normally connected to the first connector and a second process (S60, S70, S80) of controlling the switch device such that the switch device is connected to the second connector of a different type from the first connector when the first connector is not normally connected and determining whether the tuning of broadcast signals is normal by identifying whether the tuner device has tuned the broadcast signals to determine that the external cable is normally connected to the second connector.

Further, the present disclosure may determine whether the broadcast signals have been tuned when the switch device is connected to the first connector having a connector type corresponding to the reset area, determine that the external cable is normally connected to the first connector having a connector type corresponding to the digital broadcast transmission standard of the reset area when the broadcast signals have been normally tuned, and determine that the external cable is not connected to the first connector when the broadcast signals have not been tuned.

Further, the present disclosure may determine whether the second connector is normally connected by determining whether the broadcast signals have been tuned when the switch device is connected to the second connector of a type different from the first connector, when the second connector is normally connected, determine that the external cable is normally connected to the second connector having a connector type corresponding to the digital broadcast transmission standard of the reset area, and terminate the control of the switch device.

Figure 6:
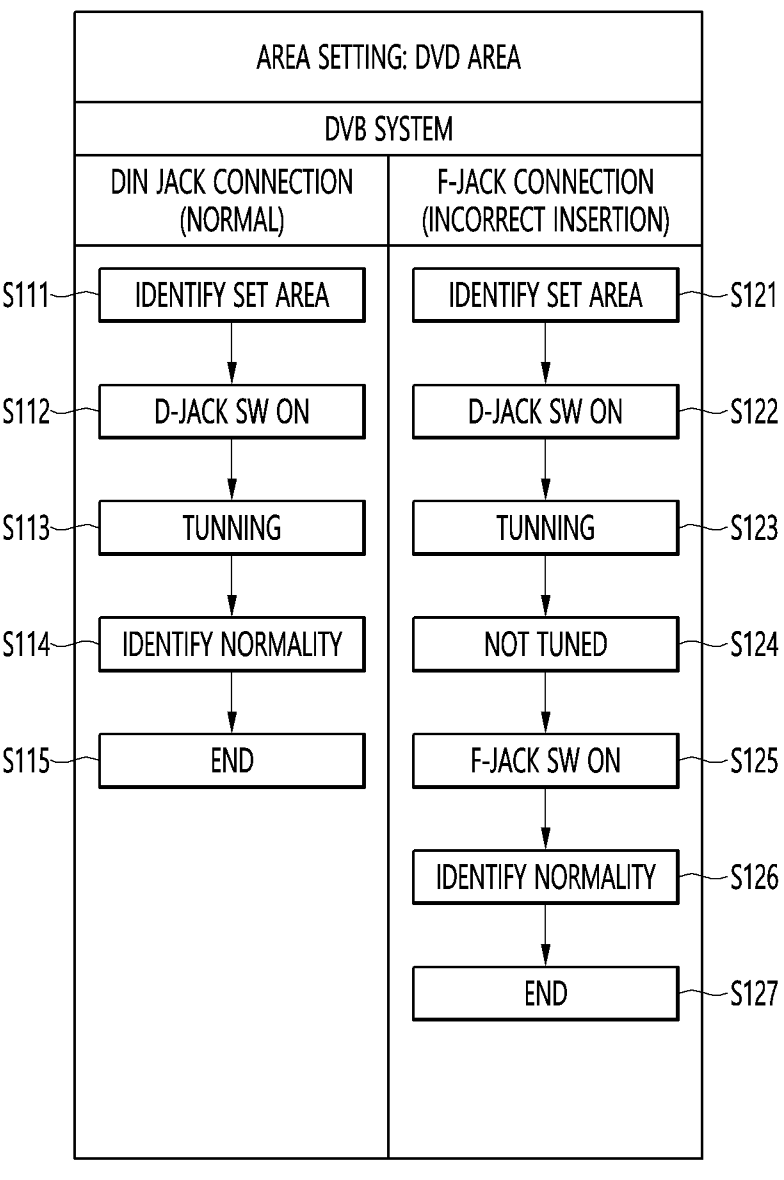
FIGS. 6 and 7 are flowcharts for describing control operation corresponding to mis-connection of a global integrated tuner apparatus according to an embodiment of the present disclosure.
Figure 7:
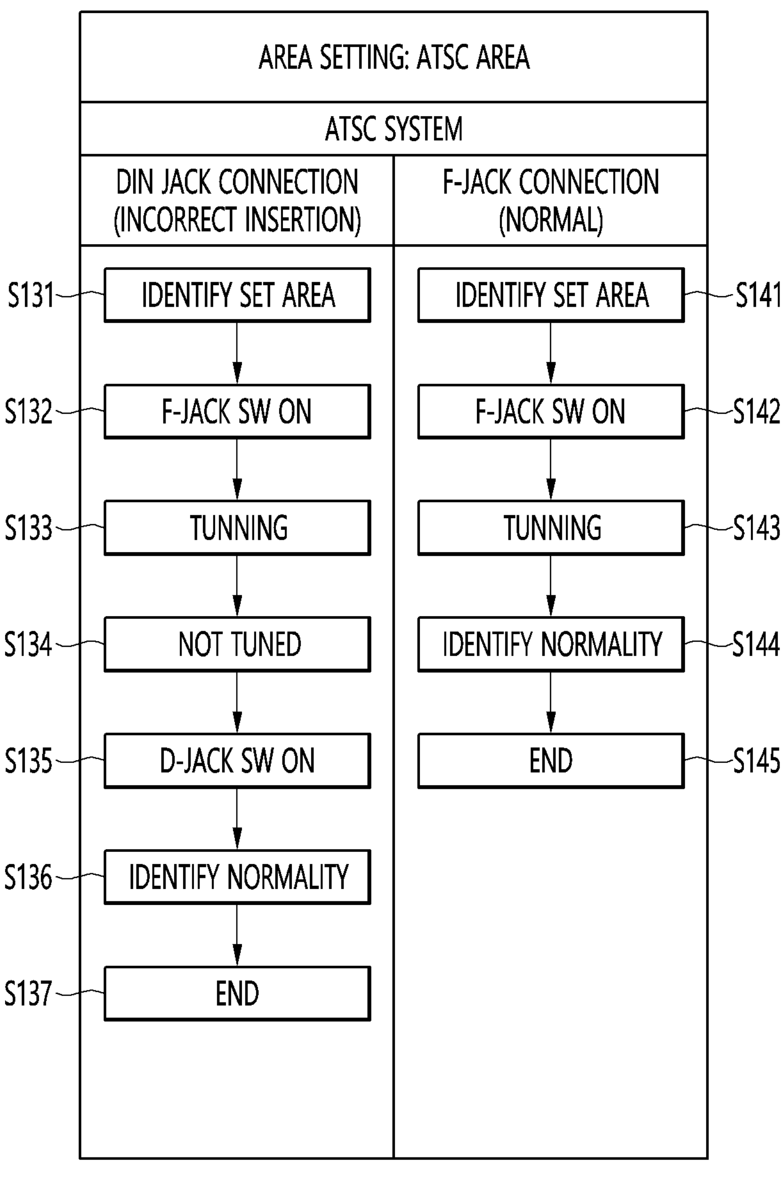

FIGS. 6 and 7 are flowcharts for describing control operation corresponding to mis-connection of a global integrated tuner apparatus according to an embodiment of the present disclosure.

Referring to FIG. 6, the global integrated tuner apparatus of the present disclosure may be mounted on a broadcast receiver located in a DVB system area.

The broadcast receiver equipped with the global integrated tuner apparatus of the present disclosure may be preset to the DVB system area to receive broadcast signals of the DVB (Digital Video Broadcasting) standard among digital broadcast transmission standards.

The global integrated tuner apparatus of the present disclosure may include a DVB type Din jack as a connector for receiving broadcast signals of the DVB standard among digital broadcast transmission standards, and an ATSC type F-Jack as a connector for receiving broadcast signals of the Advanced Television System Committee (ATSC) standard among digital broadcast transmission standards.

In an embodiment, when the global integrated tuner apparatus of the present disclosure is mounted on a broadcast receiver located in a DVB system area, a set area is preset to a DVB system area, and an external cable is normally connected to the DVB type Din Jack to receive broadcast signals of the DVB standard the present disclosure may perform control operation as described below.

First, the controller of the present disclosure may identify the set area (S11).

The controller of the present disclosure may identify pre-stored tuner setting information and identify the set area included in the tuner setting information.

As an example, the tuner setting information may include set area information, digital broadcast transmission standard information corresponding to a set area, and connector type information corresponding to the digital broadcast transmission standard of the set area.

Then, the tuner device of the present disclosure may control the switch device to be connected to the DVB type Din jack (S112).

Subsequently, the tuner device of the present disclosure may tune a broadcast signal received from the DVB type Din jack (S113).

Then, when it is determined that the tuning of the broadcast signal by the tuner device is normal (S114), the controller of the present disclosure may determine that an external cable is normally connected to the DVB type Din jack and that a broadcast signal of the DVB standard is normally received and terminate the control operation (S115).

In another embodiment, when the global integrated tuner apparatus of the present disclosure is mounted on a broadcast receiver located in a DVB system area, the set area is preset to the DVB system area, and an external cable is incorrectly inserted and abnormally connected to an ATSC type F-Jack to receive a broadcast signal of the DVB standard, the present disclosure may perform control operation as described below.

First, the controller of the present disclosure may identify the set area (S121).

The controller of the present disclosure may identify pre-stored tuner setting information and identify the set area included in the tuner setting information.

As an example, the tuner setting information may include set area information, digital broadcast transmission standard information corresponding to a set area, and connector type information corresponding to the digital broadcast transmission standard of the set area.

Then, the tuner device of the present disclosure may control the switch device to be connected to the DVB type Din jack (S122).

Subsequently, the tuner device of the present disclosure may tune a broadcast signal received from the DVB type Din jack (S123).

Further, when the tuning of broadcast signals by the tuner device is not performed (S124), the controller of the present disclosure may control the tuner device such that the switch device is disconnected from the DVB type Din jack and is connected to the ATSC type F-jack (S125).

Then, when it is determined that the tuning of the broadcast signal by the tuner device is normal (S126), the controller of the present disclosure may determine that an external cable is normally connected to the ATSC type F-jack and that a broadcast signal of the DVB standard is normally received and terminate the control operation (S127).

Referring to FIG. 7, the global integrated tuner apparatus of the present disclosure may be mounted on a broadcast receiver located in an ATSC system area.

The broadcast receiver equipped with the global integrated tuner apparatus of the present disclosure may be preset to the ATSC system area to receive broadcast signals of the ATSC (Advanced Television System Committee) standard among digital broadcast transmission standards.

The global integrated tuner apparatus of the present disclosure may include a DVB type Din jack as a connector for receiving broadcast signals of the DVB standard among digital broadcast transmission standards, and an ATSC type F-Jack as a connector for receiving broadcast signals of the Advanced Television System Committee (ATSC) standard among digital broadcast transmission standards.

In an embodiment, when the global integrated tuner apparatus of the present disclosure is mounted on a broadcast receiver located in an ATSC system area, the set area is preset to the ATSC system area, and an external cable is incorrectly inserted and abnormally connected to the DVB type Din jack to receive broadcast signals of the ASTC standard, the present disclosure may perform control operation as described below.

First, the controller of the present disclosure may identify the set area (S131).

The controller of the present disclosure may identify pre-stored tuner setting information and identify the set area included in the tuner setting information.

As an example, the tuner setting information may include set area information, digital broadcast transmission standard information corresponding to a set area, and connector type information corresponding to the digital broadcast transmission standard of the set area.

Then, the tuner device of the present disclosure may control the switch device to be connected to the ATSC type F-jack (S132).

Subsequently, the tuner device of the present disclosure may tune a broadcast signal received from the ATSC type F-jack (S133).

Further, when the tuning of broadcast signals by the tuner device is not performed (S134) the controller of the present disclosure may control the tuner device such that the switch device is disconnected from the ATSC type Din jack and is connected to the DVB type F-jack (S135).

Then, when it is determined that the tuning of the broadcast signal by the tuner device is normal (S136), the controller of the present disclosure may determine that an external cable is normally connected to the DVB type Din jack and that a broadcast signal of the ATSC standard is normally received and terminate the control operation (S137).

In another embodiment, when the global integrated tuner apparatus of the present disclosure is mounted on a broadcast receiver located in a ATSC system area, the set area is preset to the ATSC system area, and an external cable is normally connected to the ATSC type F-Jack to receive a broadcast signal of the ATSC standard, the present disclosure may perform control operation as described below.

First, the controller of the present disclosure may identify the set area (S141).

The controller of the present disclosure may identify pre-stored tuner setting information and identify the set area included in the tuner setting information.

As an example, the tuner setting information may include set area information, digital broadcast transmission standard information corresponding to a set area, and connector type information corresponding to the digital broadcast transmission standard of the set area.

Then, the tuner device of the present disclosure may control the switch device to be connected to the ATSC type F-jack (S142).

Subsequently, the tuner device of the present disclosure may tune a broadcast signal received from the ATSC type F-jack (S143).

In addition, when it is determined that the tuning of the broadcast signal by the tuner device is normal (S144), the controller of the present disclosure may determine that an external cable is normally connected to the ATSC type F-jack and that a broadcast signal of the ATSC standard is normally received and terminate the control operation (S145).

Figure 8:
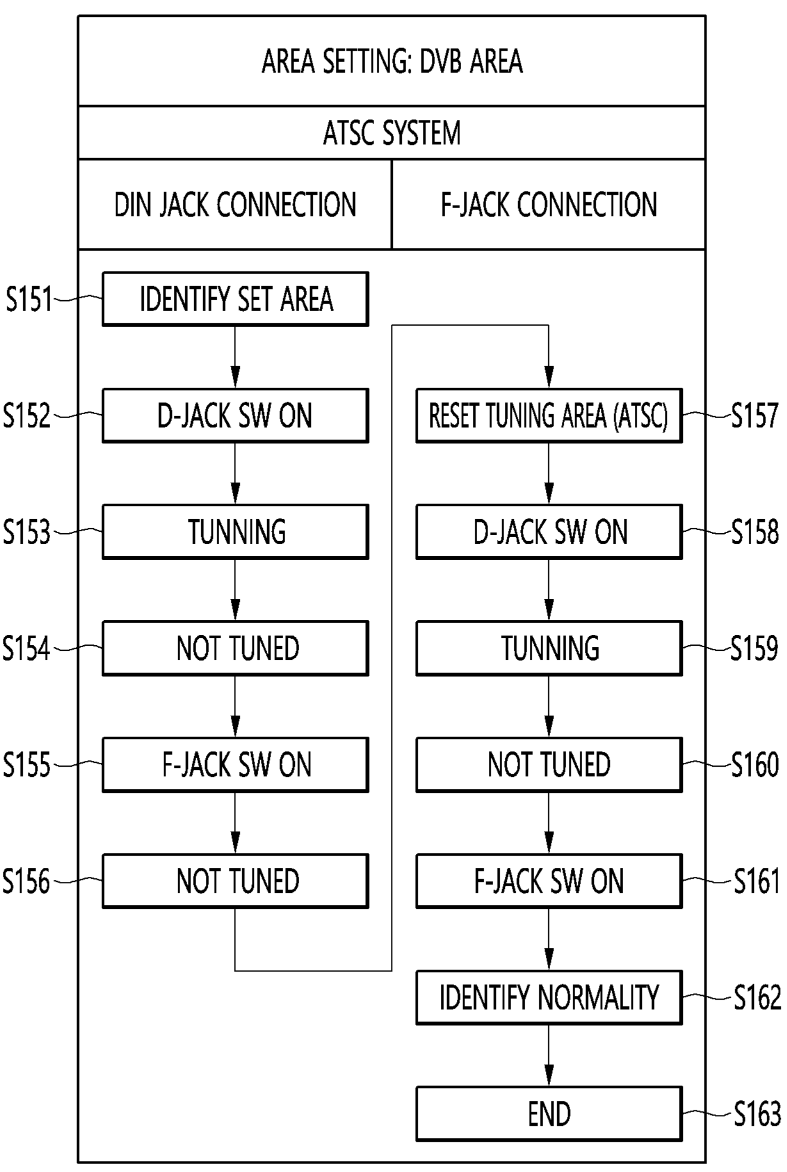
FIGS. 8 and 9 are flowcharts for describing control operation corresponding to movement of the broadcasting system of the global integrated tuner apparatus to another area according to an embodiment of the present disclosure.
Figure 9:
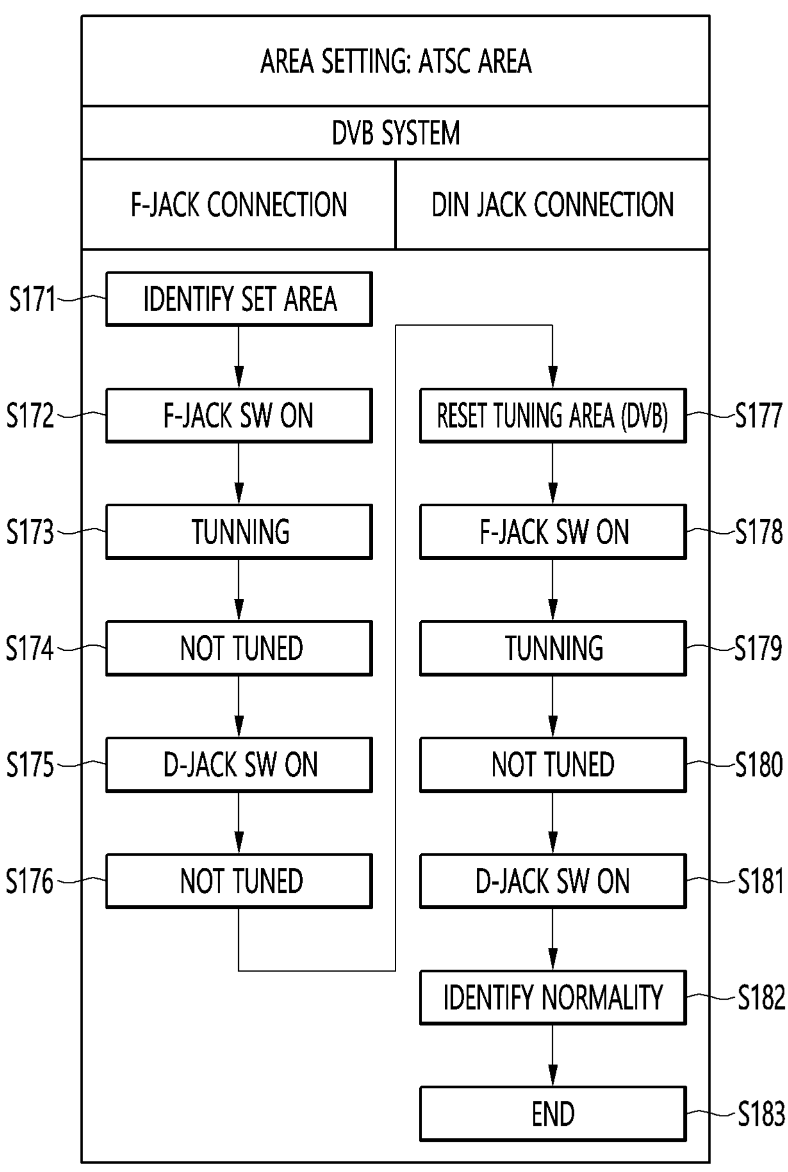

FIGS. 8 and 9 are flowcharts for describing control operation corresponding to movement of the broadcasting system of the global integrated tuner apparatus to another area according to an embodiment of the present disclosure.

Referring to FIG. 8, the broadcast receiver equipped with the global integrated tuner apparatus of the present disclosure may be preset to the DVB system area to receive broadcast signals of the DVB (Digital Video Broadcasting) standard among digital broadcast transmission standards.

The global integrated tuner apparatus of the present disclosure may include a DVB type Din jack as a connector for receiving broadcast signals of the DVB standard among digital broadcast transmission standards, and an ATSC type F-Jack as a connector for receiving broadcast signals of the Advanced Television System Committee (ATSC) standard among digital broadcast transmission standards.

As an embodiment, in a case where a broadcast receiver, in which a set area is preset to the DVB system area, moves from the DVB system area to the ATSC system area, when an external cable is connected to the DVB type Din jack, the present disclosure may perform control operation as described below.

First, the controller of the present disclosure may identify the set area (S151).

The controller of the present disclosure may identify pre-stored tuner setting information and identify the set area included in the tuner setting information.

As an example, the tuner setting information may include set area information, digital broadcast transmission standard information corresponding to a set area, and connector type information corresponding to the digital broadcast transmission standard of the set area.

Then, the tuner device of the present disclosure may control the switch device to be connected to the DVB type Din jack (S152).

Subsequently, the tuner device of the present disclosure may tune a broadcast signal received from the DVB type Din jack (S153).

Further, when the tuning of broadcast signals by the tuner device is not performed (S154), the controller of the present disclosure may control the tuner device such that the switch device is disconnected from the DVB type Din jack and is connected to the ATSC type F-jack (S155).

When the tuner device has not tuned the broadcast signals (S156), the controller of the present disclosure may determine that the broadcasting system of a currently located area is different from the broadcasting system of the set area, and reset the set area from the DVB system area to the ATSC system area (S157).

Then, the tuner device of the present disclosure may control the switch device to be connected to the DVB type Din jack (S158).

Subsequently, the tuner device of the present disclosure may tune a broadcast signal received from the DVB type Din jack (S159).

Further, when the tuning of broadcast signals by the tuner device is not performed (S160), the controller of the present disclosure may control the tuner device such that the switch device is disconnected from the DVB type Din jack and is connected to the ATSC type F-jack (S155).

When the tuner device has not tuned the broadcast signals (S156), the controller of the present disclosure may determine that the broadcasting system of a currently located area is different from the broadcasting system of the set area, and reset the set area from the DVB system area to the ATSC system area (S157).

Then, the tuner device of the present disclosure may control the switch device to be connected to the DVB type Din jack (S158).

Subsequently, the tuner device of the present disclosure may tune a broadcast signal received from the DVB type Din jack (S159).

Further, when the tuning of broadcast signals by the tuner device is not performed (S160), the controller of the present disclosure may control the tuner device such that the switch device is disconnected from the DVB type Din jack and is connected to the ATSC type F-jack (S161).

Then, when it is determined that the tuning of the broadcast signal by the tuner device is normal (S162), the controller of the present disclosure may determine that an external cable is normally connected to the ATSC type F-jack and that a broadcast signal of the ATSC standard is normally received and terminate the control operation (S163).

Referring to FIG. 9, the broadcast receiver equipped with the global integrated tuner apparatus of the present disclosure may be preset to the ATSC system area to receive broadcast signals of the ATSC (Advanced Television System Committee) standard among digital broadcast transmission standards.

The global integrated tuner apparatus of the present disclosure may include a DVB type Din jack as a connector for receiving broadcast signals of the DVB standard among digital broadcast transmission standards, and an ATSC type F-Jack as a connector for receiving broadcast signals of the Advanced Television System Committee (ATSC) standard among digital broadcast transmission standards.

As an embodiment, in a case where a broadcast receiver, in which a set area is preset to the ATSC system area, moves from the ATSC system area to the DVB system area, when an external cable is connected to the ATSC type F-jack, the present disclosure may perform control operation as described below.

First, the controller of the present disclosure may identify the set area (S171).

The controller of the present disclosure may identify pre-stored tuner setting information and identify the set area included in the tuner setting information.

As an example, the tuner setting information may include set area information, digital broadcast transmission standard information corresponding to a set area, and connector type information corresponding to the digital broadcast transmission standard of the set area.

Then, the tuner device of the present disclosure may control the switch device to be connected to the ATSC type F-jack (S172).

Subsequently, the tuner device of the present disclosure may tune a broadcast signal received from the ATSC type F-jack (S173).

Further, when the tuning of broadcast signals by the tuner device is not performed (S174), the controller of the present disclosure may control the tuner device such that the switch device is disconnected from the ATSC type F-jack and is connected to the DVB type Din jack (S175).

When the tuner device has not tuned the broadcast signals (S176), the controller of the present disclosure may determine that the broadcasting system of a currently located area is different from the broadcasting system of the set area, and reset the set area from the ATSC system area to the DVB system area (S177).

Then, the tuner device of the present disclosure may control the switch device to be connected to the ATSC type F-jack (S178).

Subsequently, the tuner device of the present disclosure may tune a broadcast signal received from the ATSC type F-jack (S179).

Further, when the tuning of broadcast signals by the tuner device is not performed (S180), the controller of the present disclosure may control the tuner device such that the switch device is disconnected from the ATSC type F-jack and is connected to the DVB type Din jack (S181).

Then, when it is determined that the tuning of the broadcast signal by the tuner device is normal (S182), the controller of the present disclosure may determine that an external cable is normally connected to the DVB type Din jack and that a broadcast signal of the DVB standard is normally received and terminate the control operation (S183).

As described above, the present disclosure may enables the same reception of digital broadcasting in areas with different digital broadcast transmission standards by integrating a plurality of connectors having different types for digital broadcast transmission standards, and a switch device for selectively connecting one of the plurality of connectors into a main board.

Further, the present disclosure may reduce the number of development models and samples, and reduce the cost of tuner development by providing flexibility and freedom in material supply by integrating different tuners for different digital broadcast transmission standards into a single main board.

Further, the present disclosure may enable the same reception of digital broadcasting without malfunctioning even when a cable with a different digital broadcast transmission standard is incorrectly inserted into a specific connector or when there is a movement to an area with a different digital broadcast transmission standard.

The present disclosure described above may be embodied as computer readable codes on a medium in which a program is recorded. The computer-readable medium includes all kinds of recording devices in which data readable by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like. The computer may also include the processor 180 of an artificial intelligence device.

What is claimed is:

1. A global integrated tuner apparatus comprising:

a plurality of connectors of different types for digital broadcast transmission standards;

a switch device configured to selectively connect one of the plurality of connectors;

a tuner device configured to tune a broadcast signal received through the connector selectively connected by controlling the switch device; and a controller configured to control the tuner device, wherein the controller is configured to identify a set area when an external cable is connected to one of the plurality of connectors, control the tuner device such that the switch device is connected to a first connector of a type corresponding to a digital broadcast transmission standard of the set area, determine whether the first connector is normally connected by determining whether the tuner device has tuned the broadcast signal, and control the tuner device such that switch device is connected to a second connector of a different type from the first connector when the first connector is not normally connected, and wherein the tuner device includes:

a frequency generator configured to generate and output a reference frequency; and a tuning controller configured to control switching of the switch device to be connected to one of the plurality of connectors in response to a control signal from the controller, and tune a frequency of the broadcast signal based on the reference frequency output from the frequency generator when the broadcast signal is input through the connector selectively connected by the switch device.

2. The global integrated tuner apparatus of claim 1, wherein the plurality of connectors include a plurality of reception jacks of different types, and wherein the plurality of reception jacks include a first type jack for receiving broadcast signals of ATSC (Advanced Television System Committee) standard and a second type jack for receiving broadcast signals of DVB (Digital Video Broadcasting) standard.

3. The global integrated tuner apparatus of claim 1, wherein the switch device is electrically connected to one of the plurality of connectors and the tuner device, and is configured to perform switching to selectively connect one of the plurality of connectors in response to a control signal from the tuner device.

4. The global integrated tuner apparatus of claim 1, wherein a noise filter is disposed between the switch device and the connector to remove noise occurring from wiring connecting the connector and the switch device.

5. The global integrated tuner apparatus of claim 1, wherein the controller is configured to identify pre-stored tuner setting information and identify a set area included in the tuner setting information when an external cable for receiving a broadcast signal is connected to one of the plurality of connectors of different types in identifying the set area.

6. A global integrated tuner apparatus comprising:

a plurality of connectors of different types for digital broadcast transmission standards;

a switch device configured to selectively connect one of the plurality of connectors;

a tuner device configured to tune a broadcast signal received through the connector selectively connected by controlling the switch device; and a controller configured to control the tuner device, wherein the controller is configured to identify a set area when an external cable is connected to one of the plurality of connectors, control the tuner device such that the switch device is connected to a first connector of a type corresponding to a digital broadcast transmission standard of the set area, determine whether the first connector is normally connected by determining whether the tuner device has tuned the broadcast signal, and control the tuner device such that the switch device is connected to a second connector of a different type from the first connector when the first connector is not normally connected, and wherein the controller is configured to identify pre-stored tuner setting information when the set area is identified in controlling the tuner device to be connected to the first connector, identify connector type information corresponding a digital broadcast transmission standard of the set area included in the tuner setting information, and control the tuner device to be connected to a first connector having a connector type corresponding to the set area based on the connector type information.

7. The global integrated tuner apparatus of claim 6, wherein the controller is configured to:

control the tuner device such that the switch device is connected to the first connector when the digital broadcast transmission standard of the set area is an ATSC (Advanced Television System Committee) standard, and control the tuner device such that the switch device is connected to the second connector when the digital broadcast transmission standard of the set area is a DVB (Digital Video Broadcasting) standard.

8. The global integrated tuner apparatus of claim 1, wherein the controller is configured to determine whether the tuner device has tuned the broadcast signal when the switch device is connected to a first connector having a connector type corresponding to the digital broadcast transmission standard of the set area in determining whether the first connector is normally connected, determine that the external cable is normally connected to a first connector having a connector type corresponding to the digital broadcast transmission standard of the set area when the tuner device has normally tuned the broadcast signal, and determine that the external cable is not connected to the first connector when the tuner device has not tuned the broadcast signal.

9. A global integrated tuner apparatus comprising:

a plurality of connectors of different types for digital broadcast transmission standards;

a switch device configured to selectively connect one of the plurality of connectors;

a tuner device configured to tune a broadcast signal received through the connector selectively connected by controlling the switch device; and a controller configured to control the tuner device, wherein the controller is configured to identify a set area when an external cable is connected to one of the plurality of connectors, control the tuner device such that the switch device is connected to a first connector of a type corresponding to a digital broadcast transmission standard of the set area, determine whether the first connector is normally connected by determining whether the tuner device has tuned the broadcast signal, and control the tuner device such that the switch device is connected to a second connector of a different type from the first connector when the first connector is not normally connected, wherein the controller is further configured to determine whether the second connector is normally connected by determining whether the tuner device has tuned the broadcast signal when the switch device is connected to the second connector of a different type from the first connector, wherein the controller is further configured to determine that a first digital broadcast transmission standard of the set area is different from a second digital broadcast transmission standard of a currently located area when the second connector is not normally connected, reset the set area to an area that provides the second digital broadcast transmission standard, control the tuner device such that the switch device is connected to a first connector of a type corresponding to the reset area, determine whether the first connector is normally connected by determining whether the tuner device has tuned the broadcast signal, and control the tuner device such that the switch device is connected to a second connector of a different type from the first connector when the first connector is not normally connected.

10. The global integrated tuner apparatus of claim 9, wherein the controller is further configured to determine that the external cable is normally connected to the second connector having a connector type corresponding to a digital broadcast transmission standard of the set area when the second connector is normally connected, and terminate control of the tuner device.

11. The global integrated tuner apparatus of claim 9, wherein the controller is configured to:

perform resetting to switch the set area from an area that provides broadcasts in an ATSC (Advanced Television System Committee) standard to an area that provides broadcasts in a DVB (Digital Video Broadcasting) standard when the first digital broadcast transmission standard of the set area is the ATSC standard and the second digital broadcast transmission standard of the currently located area is the DVB standard in resetting the set area, or perform resetting to switch the set area from the area that provides broadcasts in the DVB standard to the area that provides broadcasts in the ATSC standard when the first digital broadcast transmission standard of the set area is the DVB standard and the second digital broadcast transmission standard of the currently located area is the ATSC standard.

12. The global integrated tuner apparatus of claim 9, wherein the controller is configured to determine whether the tuner device has tuned the broadcast signal when the switch device is connected to a first connector having a connector type corresponding to the reset area in determining whether the first connector is normally connected, determine that the external cable is normally connected to a first connector having a connector type corresponding to the digital broadcast transmission standard of the reset area when the tuner device has normally tuned the broadcast signal, and determine that the external cable is not connected to the first connector when the tuner device has not tuned the broadcast signal.

13. The global integrated tuner apparatus of claim 9, wherein the controller is configured to determine whether the second connector is normally connected by determining whether the tuner device has tuned the broadcast signal when the switch device is connected to a second connector of a different type from the first connector in controlling the tuner device to be connected to the second connector of the different type from the first connector, determine that the external cable is normally connected to the second connector having a connector type corresponding to a digital broadcast transmission standard of the reset area when the second connector is normally connected, and terminate control of the tuner device.

* * * * *